United States Patent
Tangemann

(10) Patent No.: US 7,242,349 B2
(45) Date of Patent: Jul. 10, 2007

(54) METHOD OF INCREASING THE ACCURACY OF GEOGRAPHICAL INFORMATION OF A MOBILE STATION OF A RADIO COMMUNICATION SYSTEM

(75) Inventor: Michael Tangemann, Leonberg (DE)

(73) Assignee: Evolium S.A.S., Paris (FR)

( * ) Notice: Subject to any disclaimer, the term of this patent is extended or adjusted under 35 U.S.C. 154(b) by 98 days.

(21) Appl. No.: 10/844,566

(22) Filed: May 13, 2004

(65) Prior Publication Data

US 2004/0233104 A1 Nov. 25, 2004

(30) Foreign Application Priority Data

May 23, 2003 (EP) .................................. 03291242

(51) Int. Cl.
*G01S 1/08* (2006.01)
(52) U.S. Cl. ............ 342/386; 342/357.02; 342/357.06; 701/213
(58) Field of Classification Search ........... 342/357.02, 342/357.06, 357.13, 386; 701/207, 213, 701/214; 455/12.1, 13.1, 13.2
See application file for complete search history.

(56) References Cited

U.S. PATENT DOCUMENTS

| | | | |
|---|---|---|---|
| 4,949,268 A * | 8/1990 | Nishikawa et al. ......... 701/216 |
| 5,559,520 A * | 9/1996 | Barzegar et al. ......... 342/357.1 |
| 5,955,973 A * | 9/1999 | Anderson ................... 340/988 |
| 5,982,324 A * | 11/1999 | Watters et al. ........ 342/357.06 |
| 6,163,503 A * | 12/2000 | Gudbjornsson ................ 367/6 |
| 6,701,647 B2 * | 3/2004 | Stump ......................... 37/348 |
| 2002/0169527 A1 * | 11/2002 | Cline .......................... 701/21 |
| 2003/0182026 A1 * | 9/2003 | Awada et al. .................. 701/1 |
| 2004/0024522 A1 * | 2/2004 | Walker et al. ............. 701/210 |
| 2005/0255859 A1 * | 11/2005 | Krasner ................... 455/456.1 |

FOREIGN PATENT DOCUMENTS

| WO | WO 98/10307 | 3/1998 |
|---|---|---|
| WO | WO 98/57506 | 12/1998 |
| WO | WO 03/038466 A2 | 5/2003 |

* cited by examiner

*Primary Examiner*—Dao Phan
(74) *Attorney, Agent, or Firm*—Sughrue Mion, PLLC

(57) ABSTRACT

A method of increasing the accuracy of geographical information of a mobile station of a radio communication system is described. The geographical information of the mobile station is evaluated without using a GPS receiver. Stored positions of other mobile stations using GPS receivers, are used to adapt the geographical information.

12 Claims, 2 Drawing Sheets

METHOD OF INCREASING THE ACCURACY OF GEOGRAPHICAL INFORMATION OF A MOBILE STATION OF A RADIO COMMUNICATION SYSTEM

The invention is based on a priority application EP 03 291 242.0 which is hereby incorporated by reference.

FIELD OF THE INVENTION

The invention relates to a method of increasing the accuracy of geographical information of a mobile station of a radio communication system. The invention also relates to a corresponding mobile station, a corresponding radio communication system and to a location estimator of a radio communication system.

BACKGROUND OF THE INVENTION

In a radio communication system, e.g. in the Global System for Mobile Communication (GSM), communications are built up between a base station and a number of mobile stations. The mobile stations are used by users and may change their geographical location due to movements of the users. The base station is operated by a provider who offers location-based services to the users. Such services may comprise e.g. location dependent weather forecasts and the like.

For these location-based services, it is necessary that the provider knows the geographical location of the respective user. For that purpose, at least three methods are known to evaluate the geographical location.

In a first method, the fact is used that the geographical area covered by the provider is partitioned into cells and that each cell carries a particular identification. This identification is used as a geographical information. The identification is available for the respective mobile station as well as for the base station and may therefore be used by the location-based service. This first method is inexpensive but not very accurate.

A second method is based on the first method and comprises the following additions. E.g. the signal strength of the radio signal being transmitted from the mobile station to the base station is measured. With this information, it is possible to estimate the distance of the mobile station from the base station. Similar measurements and evaluations may be carried out depending on the propagation time of a signal e.g. from the base station to the mobile station and back. The estimated distance is then used in addition to the cell identification as a geographical information. This second method requires additional steps to be carried out and therefore additional costs compared to the first method. However, it is more accurate than the first method.

In a third method, the Global Positioning System (GPS) is used. For that purpose, a GPS receiver for receiving GPS signals has to be present in the mobile station. The geographical information of the received GPS signals may then be used by the location-based service. Of course, this third method is most accurate but also most expensive.

It is an object of the invention to provide a method for evaluating geographical information of the location of the mobile station with high accuracy without requiring high additional costs.

SUMMARY OF THE INVENTION

According to the invention, this object is achieved with the method increasing the accuracy of geographical information of a mobile station of a radio communication system, wherein the geographical information of the mobile station is evaluated without using a GPS receiver, and wherein stored positions of other mobile stations using GPS receivers, are used to adapt the geographical information.

This object is also achieved with the mobile station of a radio communication system, wherein geographical information of the mobile station is evaluated without using a GPS receiver, and wherein stored positions of other mobile stations using GPS receivers, are used to adapt the geographical information. This object is also achieved with a location estimator located within a radio communication system, the radio communication system comprising a mobile station, wherein geographical information of the mobile station is evaluated without using a GPS receiver, and wherein stored positions of other mobile stations using GPS receivers, are used to adapt the geographical information. This object is also achieved with a radio communication system comprising a mobile station, wherein geographical information of the mobile station is evaluated without using a GPS receiver, and wherein stored positions of other mobile stations using GPS receivers, are used to adapt the geographical information.

According to the invention, the geographical information of the mobile station is evaluated without using a GPS receiver. However, stored positions of other mobile stations using GPS receivers, are then used to adapt this geographical information. As a result, the high accuracy of the GPS based positions are used to increase the accuracy of the geographical information which was evaluated without the use of a GPS receiver. Therefore, it is possible to increase the accuracy of the geographical information if there are at least some mobile stations which comprise a GPS receiver.

It is advantageous to evaluate the geographical information based on an identification of a cell in which the mobile station is located at present. This is a very inexpensive method to generate the geographical information. The information is then adapted according to the invention so that, at the end, the geographical information becomes very accurate.

In an advantageous embodiment of the invention, areas with a higher concentration of positions and areas with a lower concentration of positions are defined. Advantageously, the geographical information of the mobile station without a GPS receiver is adapted such that it is more in an area with a higher concentration of positions.

Further features, applications and advantages of the inventions will become apparent from the following description of exemplary embodiments of the invention which are shown in the drawings. There, all described and shown features themselves or in any combination represent the subject matter of the invention, independently of their wording in the description or their representation in the drawings and independently of their combination in the claims or the dependencies of the claims.

DETAILED DESCRIPTION OF THE INVENTION

The invention will now be described in connection with the Global System for Mobile Communication (GSM); however, it is emphasized that the invention may be used as well in connection with any other kind of cellular radio communication system.

As already described, communications may be built up between a base station BS and a number of mobile stations MS. The mobile stations MS are used by users and may change their geographical location due to movements of the users. The base station is operated by a provider who offers location-based services to the user.

It is assumed that there are mobile stations MS present which comprise a receiver for the Global Positioning System (GPS). The number of these mobile stations MS may be small compared to the number of mobile stations MS having no such receiver. However, it is assumed that this number is at least not negligible.

If a user wants to use a location-based service with his/her mobile station MS, this service requests the geographical information of the mobile station MS of the user.

In a first step, it is assumed that the mobile station MS of the user does not comprise a GPS receiver. In this case, the base station BS evaluates geographical information according to the second method as described above. This means that the base station BS evaluates the identification of the cell in which the mobile station MS is located at present as well as e.g. the distance of the mobile station MS from the base station BS. This geographical information is forwarded to a location estimator which is located within the radio communication system.

Furthermore, it is assumed that not only one, but a number of mobile stations MS without a GPS receiver forward the afore-described geographical information to the location estimator. The location estimator stores all received geographical information. This leads to a situation as outlined in FIG. 1a.

Figure 1A:
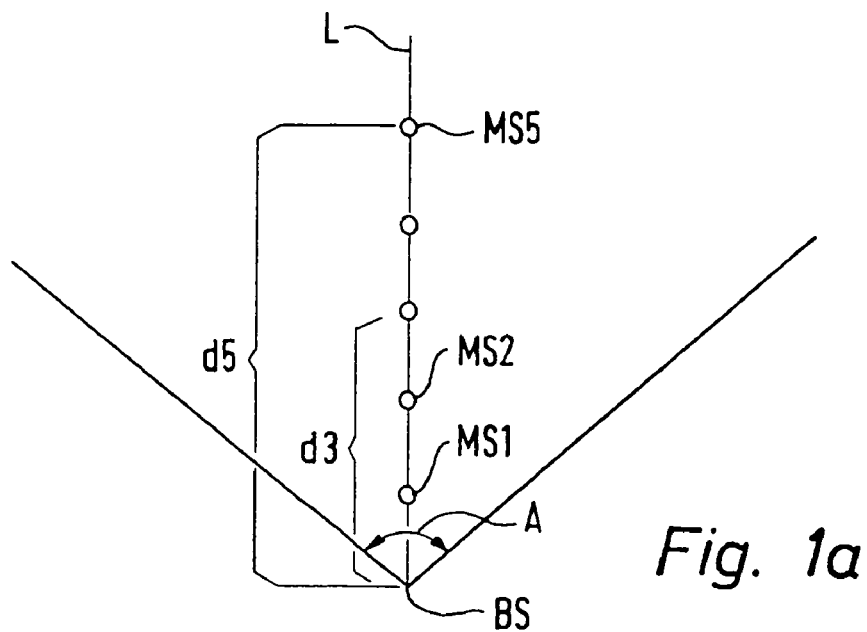
FIGS. 1a and 1b show schematic views of an embodiment according to the invention.

FIG. 1a shows the base station BS and a number of estimated locations of mobile stations MS1 to MS5. The mobile stations MS1 to MS5 do not have a GPS receiver. The base station BS transmits its signals in those directions as defined by the transmission angle A in FIG. 1a. The distances d1 to d5 between the base station BS and the different mobile stations MS1 to MS5 are measured and evaluated according to the described second method. However, as it is only possible to evaluate the distance of a mobile station MS from the base station BS but not the specific angle where the mobile station MS is located within the transmission angle A, all estimated locations of the mobile stations MS1 to MS5 are depicted in FIG. 1a in one line L one after the other with their evaluated respective evaluated distances d1 to d5. As a result, the estimated positions of the mobile stations MS1 to MS5 within FIG. 1a are only correct with regard to their distances d1 to d5 but not with regard to the angle given by the line L.

Due to the fact that all geographical information is stored in the location estimator, the situation as shown in FIG. 1a is also present in the location estimator.

In a second step, it is assumed that the mobile station MS of the user comprises a GPS receiver and is therefore able to receive GPS signals. In this case, this mobile station MS forwards these GPS signals or the resulting geographical information to the location estimator. However, in addition and at the same time, the geographical information according to the second method is evaluated as described above. This means that the identification of the cell in which the mobile station MS is located at present as well as e.g. the distance of the mobile station MS from the base station BS is evaluated. This geographical information is also forwarded to the location estimator. All information is stored in the location estimator.

Again, it is assumed that not only one, but a number of mobile stations MS with a GPS receiver forward the afore-described GPS based geographical information and cell-based geographical information to the location estimator. This leads to a situation as outlined in FIG. 1b.

Figure 1B:
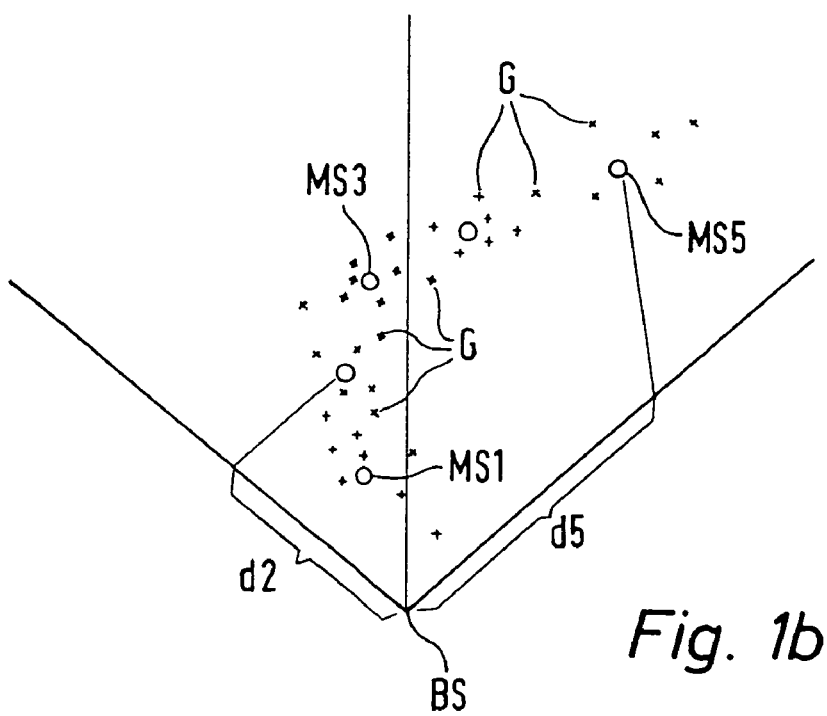
Figure 2:
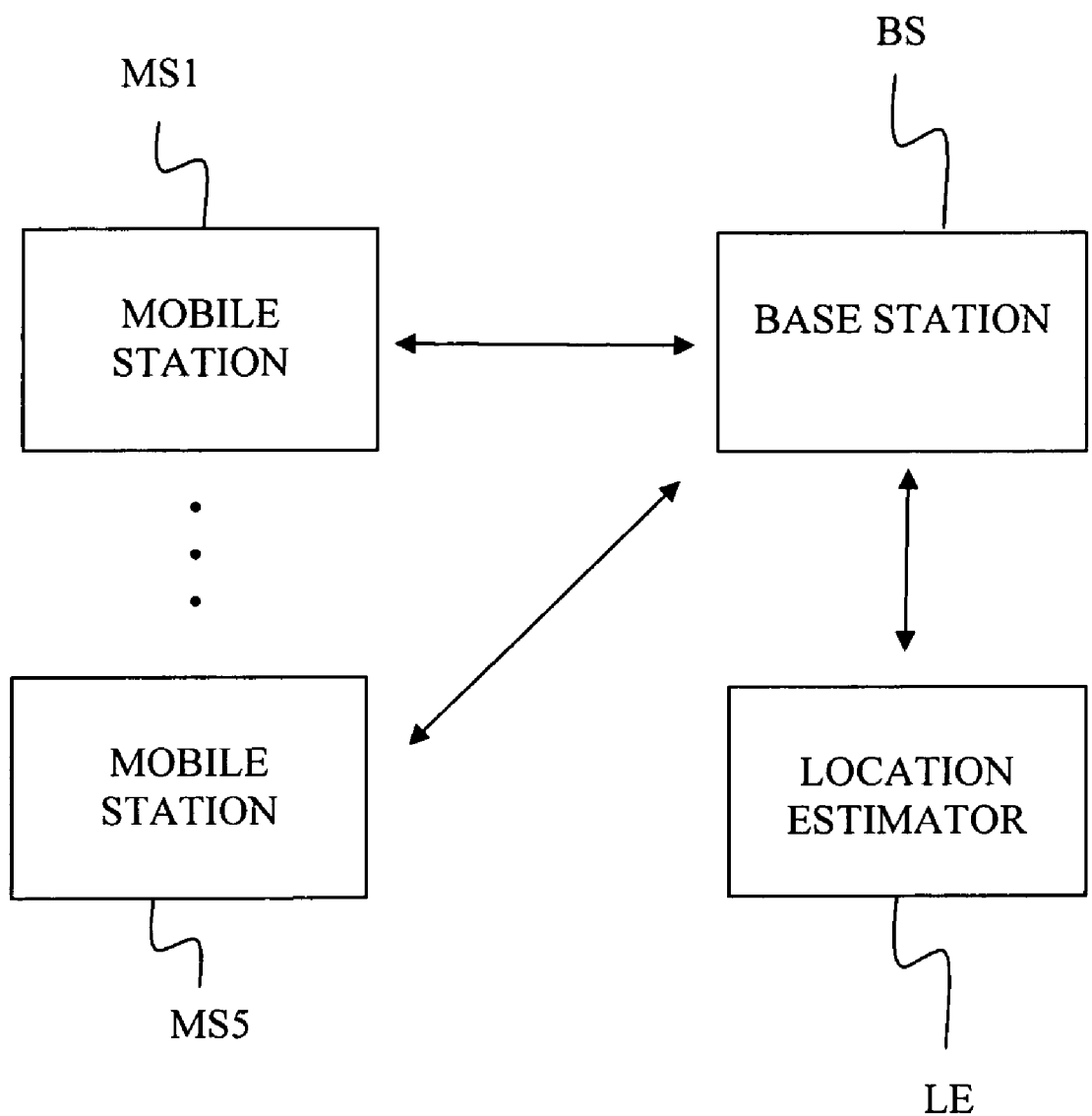
FIG. 2 is diagram of a radio communication system according to an embodiment of the present invention.

FIG. 1b corresponds to FIG. 1a. It also shows the base station BS and the mobile stations MS1 to MS5. Again, the mobile stations MS1 to MS5 do not have a GPS receiver. However, in addition to FIG. 1a, FIG. 1b shows a number of positions G which result from geographical information measured by those mobile stations MS which comprise a GPS receiver.

As can be seen in FIG. 1b, these positions G are not equally distributed within the angle A of the base station BS. Instead, there are areas with a higher concentration of the positions G and areas with a lower concentration of the positions G. The areas with a higher concentration could be streets or the like and the areas with a lower concentration could be woods or the like. In FIG. 1b, the positions G are concentrated along a slope which could be e.g. a curved street.

The location estimator LE now adapts the positions of the mobile stations MS1 to MS5 as shown in FIG. 1a depending on the positions G of FIG. 1b. As described, the positions of the mobile stations MS1 to MS5 of FIG. 1a are evaluated without having GPS receivers whereas the positions G of FIG. 1b are evaluated based on GPS receivers.

In general, the positions of the mobile stations MS1 to MS5 are adapted such that they are located in areas with a high concentration of positions G. This adaptation is based on the assumption that it is more probable that the mobile stations MS1 to MS5 are somewhere along e.g. the street and not in the wood.

As can be seen in FIG. 1b, this leads to an adaptation of the positions of the mobile stations MS1 to MS5 such that their positions are somewhere in the area with a higher concentration. As well, it may be possible that the distances d1 to d5 are also adapted using the GPS geographical information of other mobile stations. In other words, the adaptation may not only relate to the respective angles of the positions of the mobile stations MS1 to MS5 within the angle A of the base station BS but also to the distances d1 to d5 of these mobile stations MS1 to MS5.

This means in other words that the positions G measured with high accuracy by GPS receivers, are used to adapt the positions of the mobile stations MS1 to MS5 measured without GPS receivers and therefore only with lower accuracy.

The adaptation may be carried out in various ways. As already described, it is possible to evaluate areas with a higher and lower concentration of positions G measured by GPS receivers and to adapt the positions of the mobile stations MS in the direction of the areas with a higher concentration. In addition it is also possible to evaluate statistical probabilities based on the positions G which may then be used to carry out the adaptation of the positions of the mobile stations MS. As well, it is possible to evaluate average positions between the GPS based geographical information measured by a GPS receiver of a mobile station MS and the cell based geographical information evaluated by the location estimator for the same mobile station at the same time. Based on such average positions, the positions of other mobile stations MS having no GPS receiver may be adapted.

As long as only few positions G measured by GPS receivers are available, the described adaptation of the position of a mobile station MS having no GPS receiver may only lead to minor increases of the accuracy of the evaluated position of the respective mobile station MS. However, if the number of positions G increases, the accuracy of the evaluated positions of mobile stations MS having no GPS receiver also increases. Insofar, the described adaptation comprises a self-learning component which results in increasing accuracy.

The invention claimed is:

1. A method of increasing the accuracy of geographical information of a mobile station of a radio communication system, where a plurality of other mobile stations are in communication within said radio communication system, comprising:
   evaluating the geographical information of the mobile station without using a GPS receiver, and
   using stored positions of said other mobile stations to adapt the geographical information of said mobile station, wherein said other mobile stations use GPS receivers.

2. The method of claim 1, wherein the geographical information is evaluated based on an identification of a cell in which the mobile station is located at present.

3. The method of claim 2, wherein the geographical information is evaluated based on an estimated distance of the mobile station from a base station.

4. The method of claim 3, wherein the distance is evaluated by measuring the strength of the signal being transmitted from the mobile station to the base station.

5. The method of claim 3 wherein the distance is evaluated by measuring the propagation time of the signal being transmitted from the mobile station to the base station.

6. The method of claims 1, wherein the other mobile stations receive a GPS signal and provide the positions to a location estimator, and wherein the positions are stored in the location estimator.

7. The method of claim 6, wherein the location estimator evaluates the positions and defines areas with a higher concentration of positions and areas with a lower concentration of positions.

8. The method of claim 7, wherein the geographical information of the mobile station without a GPS receiver is adapted such that the geographical information indicates that mobile station is located is more in an area with a higher concentration of positions.

9. The method of claims 7, wherein the geographical information of the mobile station without a GPS receiver is evaluated depending on statistical probabilities of the positions of those mobile stations having a GPS receiver.

10. A mobile station of a radio communication system, wherein geographical information of the mobile station is evaluated without using a GPS receiver, and wherein stored positions of other mobile stations using GPS receivers, are used to adapt the geographical information.

11. A location estimator located within a radio communication system, the radio communication system comprising a mobile station, wherein geographical information of the mobile station is evaluated without using a GPS receiver, and wherein stored positions of other mobile stations using GPS receivers, are used to adapt the geographical information.

12. A radio communication system comprising a mobile station, wherein geographical information of the mobile station is evaluated without using a GPS receiver, and wherein stored positions of other mobile stations using GPS receivers, are used to adapt the geographical information.

* * * * *